INVENTOR.
KASIMIR LOPAS
BY
BLAIR CESARI AND ST.ONGE

ATTORNEYS

United States Patent Office 3,611,789
Patented Oct. 12, 1971

3,611,789
ROTARY MOTION CONSISTENCY METER
Kasimir Lopas, 118 Skyview Drive,
Stamford, Conn. 06902
Filed Nov. 10, 1969, Ser. No. 875,468
Int. Cl. G01n 11/16
U.S. Cl. 73—59           15 Claims

ABSTRACT OF THE DISCLOSURE

Two rotary motion consistency meter embodiments are disclosed, one with continuous and one with oscillatory rotary motion. In both embodiments a fiber containing stock solution is circulated through the meter and the fibers are allowed to staple over the edges of thin, planar blades which are rotated in the stock solution by a motor having a constant output. The stapling produces hydraulic drag against the motor which causes an output variable of the motor to vary in a measurable manner as an indicator of stock consistency. The meters are provided with expansion chambers to slow down stock velocity through the meter, and with means for keeping the meters free from fiber clogging.

BACKGROUND OF THE INVENTION

An improtant process variable in many industries, and particularly in the pulp and paper industry is consistency. Consistency broadly is a measure of the resistance to movement of a fluid or fluid mixture; as applied to the pulp and paper industry, it is a measure of the amount of fiber in the pulp stock per unit weight of fiber plus water and additives.

The importance of consistency measurement has led to the development of various consistency measuring devices; these include devices containing viscosity tubes, paddle wheel sensors, shear floats and scimitar blades. None of these instruments however have been fully satisfactory, particularly in the pulp and paper industry since many are influenced by factors other than strictly the fiber content of the pulp stock.

Accordingly, representative objects of the present invention are to provide an improved consistency meter for measuring the fiber content of pulp stock or the like, and to provide such a consistency meter which is simple in construction, self-cleaning, effective, reliable and long lasting.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

SUMMARY OF THE INVENTION

The present invention relates to consistency meters and more particularly to consistency meters particularly adapted to measure the fiber content of paper pulp stock.

The meter comprises a housing through which pulp stock is constantly circulated in use. The stock preferably enters the meter through an expansion chamber which decelerates the stock flow sufficiently to reduce any effect thereof on the meter reading.

A rotatable shaft upon which are mounted a plurality of blades is provided within an inner chamber in the meter, in the line of stock flow. In one embodiment of the invention the shaft and blades are adapted for continuous rotary motion, that is in one direction, while in another embodiment the rotary motion is oscillatory. The blades of either meter are thin and planar, and are mounted in one or more planes which are perpendicular to the axis of shaft rotation so that the blades are substantially unaffected by stock components other than fibers.

In the continuous motion meter, the blades have an eccentric curvature in relation to the shaft; upon rotation of the shaft, fibers in the pulp stock tend to be snagged or stapled over the leading edge and thereafter slide along the length of each blade. In the oscillatory motion meter, the blades project perpendicularly from the shaft in sunburst fashion and fiber stapling alternately occurs over opposite edges of each blade. In both meters, the effect of fiber stapling on the blades is to produce a degree of hydraulic drag which is measurable and which is directly related to and substantially affected only by the amount of fibers in the pulp stock.

The blades of either meter are preferably surrounded by a shroud having a surface formed with scalloped protrusions. The protrusions serve to induce hydraulic braking of the pulp stock in a direction which will increase the accuracy of the particular meter.

The preferred means for rotating the shaft and attached blades in the continuous motion meter is through a motor having either a constant speed or constant torque output. By then measuring either the change in speed of the constant torque motor or the change in torque or motor load of the constant speed motor produced by the hydraulic drag created on the blades by the stapling fibers, a measure of the fiber content of the pulp stock is obtained.

The oscillatory motion meter is preferably driven by an oscillatory motor of constant torque output although a constant frequency oscillating motor can be used. The hydraulic drag produced by fiber stapling causes a decrease in the frequency of oscillation of the constant torque motor which can be measured to indicate the fiber content of the pulp stock.

Means are also preferably provided for cleaning the walls of the inner chamber of the meter through a vortex of water without adverse effects on accuracy. In addition, means are also preferably provided for constantly lubricating moving meter parts in order to reduce friction and resultant wear.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DESCRIPTION OF THE PREFERRED EMBODIMENTS

Figure 1:
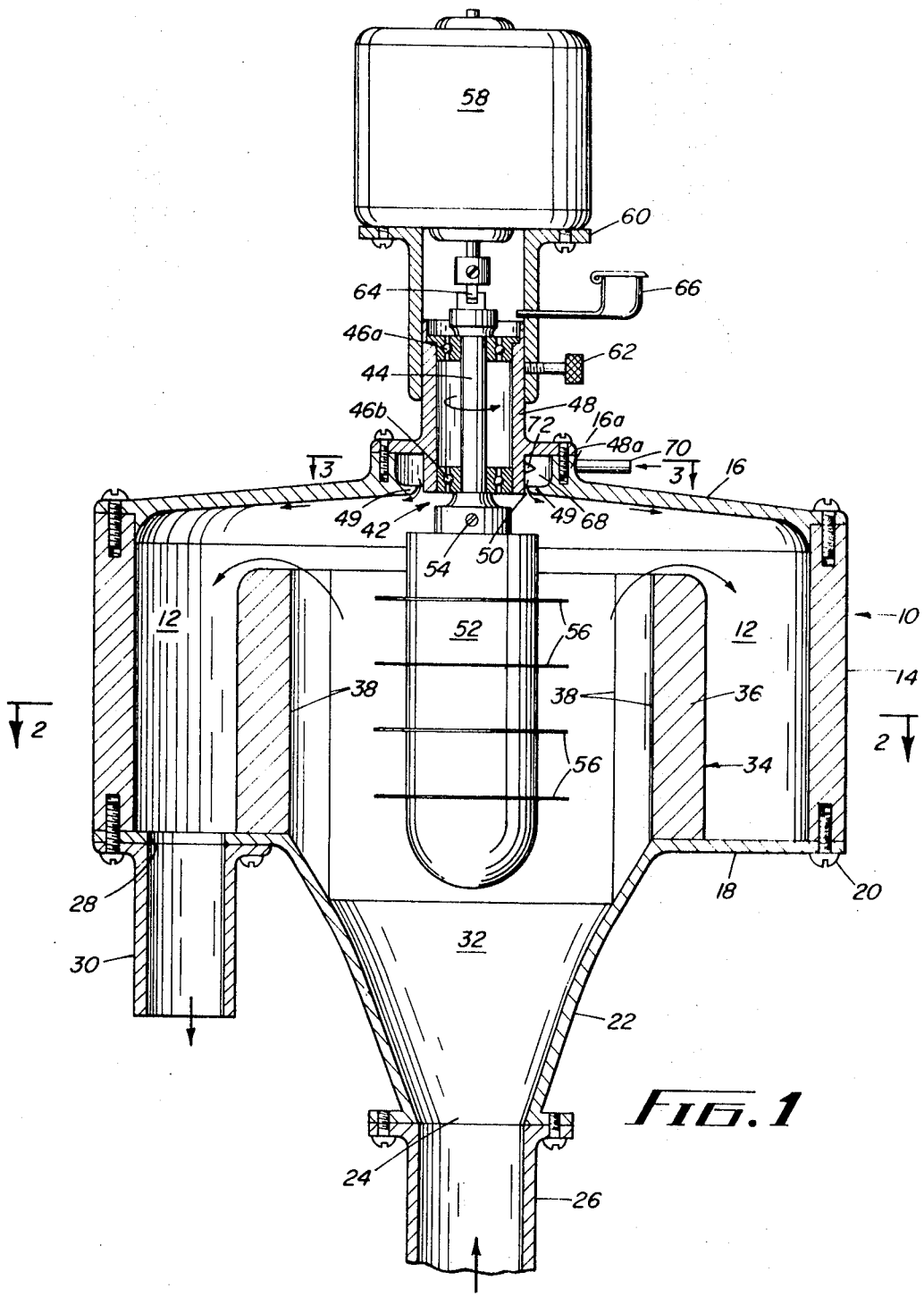
FIG. 1 is a front elevation view in section of the continuous rotary motion consistency meter of the invention.

Referring to FIG. 1, the continuous rotary motion consistency meter of the invention comprises a housing 10 which defines therein an inner chamber 12. Housing 10 may be formed, for example, as a unitary casting, or as shown may comprise a cylindrical ring 14 substantially enclosed at the top by a cover plate 16 and at the bottom by an enclosure 18. The various members forming housing 10 may be secured together by bolts 20 as shown are alternatively by rivets, brazing, welding or the like.

Bottom enclosure 18 as shown n FIG. 1 is preferably made with a tapered extension 22 which increases in internal volume from an inlet opening 24 at the extremity thereof. Opening 24 provides an inlet for the stock solution to inner chamber 12 and may be directly connected to an inlet pipe 26 leading from the mainstream of the stock solution in the papermaking system. Bottom enclosure 18 is also provided with an outlet opening 28 preferably adjacent one side thereof. Opening 28 forms an outlet for the stock solution from inner chamber 12 and may be directly connected with an outlet pipe 30 which routes the stock solution back into the mainstream of the papermaking system.

Figure 2:
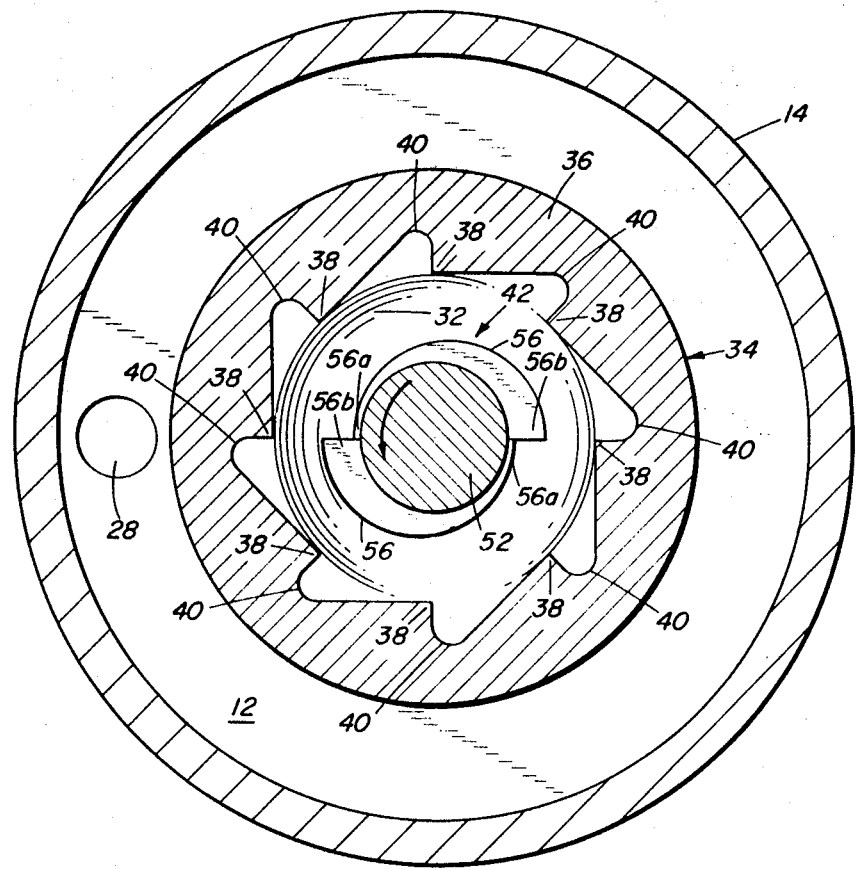
FIG. 2 is a top plan sectional view taken along line 2—2 of FIG. 1.

Extension 22 forms the bottom part of an expansion chamber 32 which communicates with inner chamber 12. The upper portion of expansion chamber 32 comprises a shroud 34 formed by an upstanding, substantially circular rim 36 secured to the inner surface of bottom enclosure 18 and coaxial with extension 22. Referring to FIG. 2, the inner surface of shroud 34 has formed therein a plurality of protrusions 38 which project inwardly and which are aligned with the longitudinal axis of rim 36 as shown in FIG. 1. Protrusions 38 function to induce hydraulic braking of the stock solution in a manner and for reasons more fully discussed hereinafter. While protrusions 38 have been shown in FIG. 2 as being formed by scalloped cuts 40 into the inner surface of rim 36, it will be understood that other protrusion configurations may also be used for the same purpose.

Referring back to FIG. 1, shroud 34 is concentric with and surrounds the working parts of the consistency meter which comprise in the main a rotatable shaft structure 42. Shaft structure 42 comprises a drive shaft 44 which is rotatably mounted in a pair of roller bearings 46a and 46b. Bearings 46a and 46b are in turn mounted in a bearing sleeve 48 which projects into inner chamber 12 through an opening surrounded by a lip 49. Lip 49 is preferably spaced slightly from sleeve 48 to form an orifice 50 in cover plate 16. Bearing sleeve 48 may be secured to cover plate 16 by bolts, rivets, welding or similar means which serve to secure a flange 48a projecting from sleeve 48 to a mating, upstanding boss 16a on cover plate 16.

Still with reference to FIG. 1, an enlarged rotor 52 is secured by means of a set screw 54 or the like to that end of drive shaft 44 which projects into inner chamber 12. Rotor 52 projects down into expansion chamber 32 and is concentric with shroud 34. Rotor 52 carries on its surface at least one, and preferably a plurality of blades 56.

Referring now to FIG. 2, each blade 56 comprises a thin, planar, eccentrically curved segment mounted to rotor 52. The leading edge 56a of each blade approaches a tangential matching with rotor 52, while the trailing edge 56b flares outwardly from the surface of rotor 52. Each blade should be mounted to rotor 52 with its plane perpendicular to the axis of rotation thereof so that only the thin edges of each blade are presented to the stock solution during rotation. In this way, extraneous factors such as the density, viscosity and composition of the liquid portions of the stock solution will have substantially no effect on the blades.

Blades 56 are preferably made from a thin, abrasive-resistant material; for example, blades made from stainless steel of approximately .005 inch thickness and having beveled edges of approximately .001 inch radius have been found to be quite satisfactory. All surfaces of each blade are preferably highly polished to decrease friction between the blades and the fibers in the stock solution.

As shown in FIG. 2, blades 56 are preferably provided in pairs on rotor 52 with the leading edge 56a of each blade abutting or substantially abutting the trailing edge 56b of the other blade of the pair. As is further shown in FIG. 1, a plurality of such blade pairs are preferably stacked along the length of rotor 52. While four such blade pairs have been shown for purposes of illustration, it will be understood that more or fewer pairs may be used as needed.

Blades 56 are driven through rotor 52 and attached drive shaft 44 by a motor 58 shown in FIG. 1. Motor 58 may be mounted over the consistency meter on a motor bracket 60 which is telescopically secured over bearing sleeve 48 by a set screw 62. Motor 58 is preferably directly connected to drive shaft 44 through a linkage 64 as shown in FIG. 1.

Motor 58 should provide a substantially constant, measurable output so that the effect of varying stock consistencies thereon can be determined. Preferably, the output of motor 58 will be either constant speed or constant torque. For constant torque use, Hall effect brushless DC motors of the type manufactured by either Siemens or AEG of West Germany may be used. Constant torque is achieved by applying a constant current power supply to the motor. Motor speed is then conveniently measured by rectifying and coupling back the E.M.F. of the stator windings. As will be seen from the following description, the speed of the motor under these conditions in inversely proportional to the amount of fibers in the stock solution.

Preferably, roller bearings 46a and 46b are provided without seals so as to reduce friction and increase motor efficiency. Accordingly, an oil cup device 66 (FIG. 1) may be provided to supply oil at a constant rate through bracket 60 to bearings 46a and 46b. Alternatively, a metered oiling mechanism driven by a timing motor may be employed for the same purpose.

Still referring to FIG. 1, in operation stock solution enters the meter from inlet pipe 26 at a constant rate. The stock solution passes through inlet opening 24 and into expansion chamber 32. Because of the increasing volume of expansion chamber 32 in the direction of stock flow, the flow velocity of the stock solution is slowed down sufficiently to substantially eliminate any effect therefrom on the meter measurements.

Rotor 52 is driven by motor 58 and thus rotates continuously in the stock solution at either constant speed or constant torque. As rotor 52 rotates, the fibers in the stock solution tend to snag or staple over the edges of blades 56. Because of blade rotation, the fibers are also caused to slide over the blades in a direction opposite the direction of rotation, that is, from leading edge 56a to trailing edge 56b. The stapling and sliding of the fibers on blades 56 produces a degree of hydraulic drag against motor 58 which is directly related to the fiber content of the stock solution. In the case of a meter driven by a constant speed motor 58, the hydraulic drag causes an increase in torque or motor load which may be measured and related to fiber content. When a constant torque motor 58 is used, the hydraulic drag produced by fiber stapling causes a reduction in motor speed which may be measured as previously discussed to indicate the fiber content of the stock solution.

As can be seen by reference to FIG. 2, once the stock fibers reach trailing edge 56b of each blade they slide off so that each blade is in effect self-cleaning. This serves to prevent any clogging of rotor 52 by excess numbers of fibers. As will further be seen by reference to FIG. 2, the stock solution tends to swirl around the interior of expansion chamber 34 due to the rotation of rotor 52; however, the protrusions 38 on the interior surface of shroud 34 act to brake such swirling of the stock solution and thereby increase meter accuracy.

Once having passed through expansion chamber 32 past blades 56, the stock solution overflows the upper end of shroud 34 (FIG. 1) and is discharged through outlet opening 28 back into the mainstream of the papermaking system.

Figure 3:
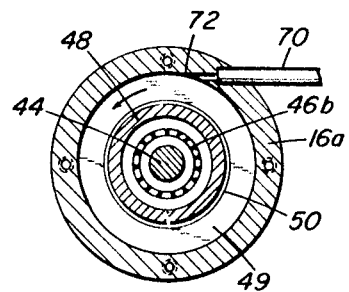
FIG. 3 is a top plan sectional view taken along line 3—3 of either FIG. 1 or FIG. 4.

The fibers in the stock solution have a further tendency to adhere to the walls of inner chamber 12. Accordingly, means are provided to clean the inner walls to prevent any undesirable build-up of stock fibers which would otherwise clog the meter. Referring to FIG. 1, a circular purge-water chamber 68 is provided over orifice 50. The walls of chamber 68 are defined by bearing sleeve 48, flange 48a, upstanding boss 16a and lip 49. As shown in FIG. 2, a fitting 70 connects tangentially at 72 (FIGS. 1 and 3) with the interior of chamber 68, and provides means for connection with an outside water source. Water forced into chamber 68 under pressure thus produces a vortex therein, and the water escaping through orifice 50 possesses sufficient centrifugal force so that it generally follows the interior contours of cover plate 16 and housing ring 14. The water thus serves to wash down the interior walls of chamber 12 without effecting or introducing error to the rotating parts of the meter.

Figure 4:
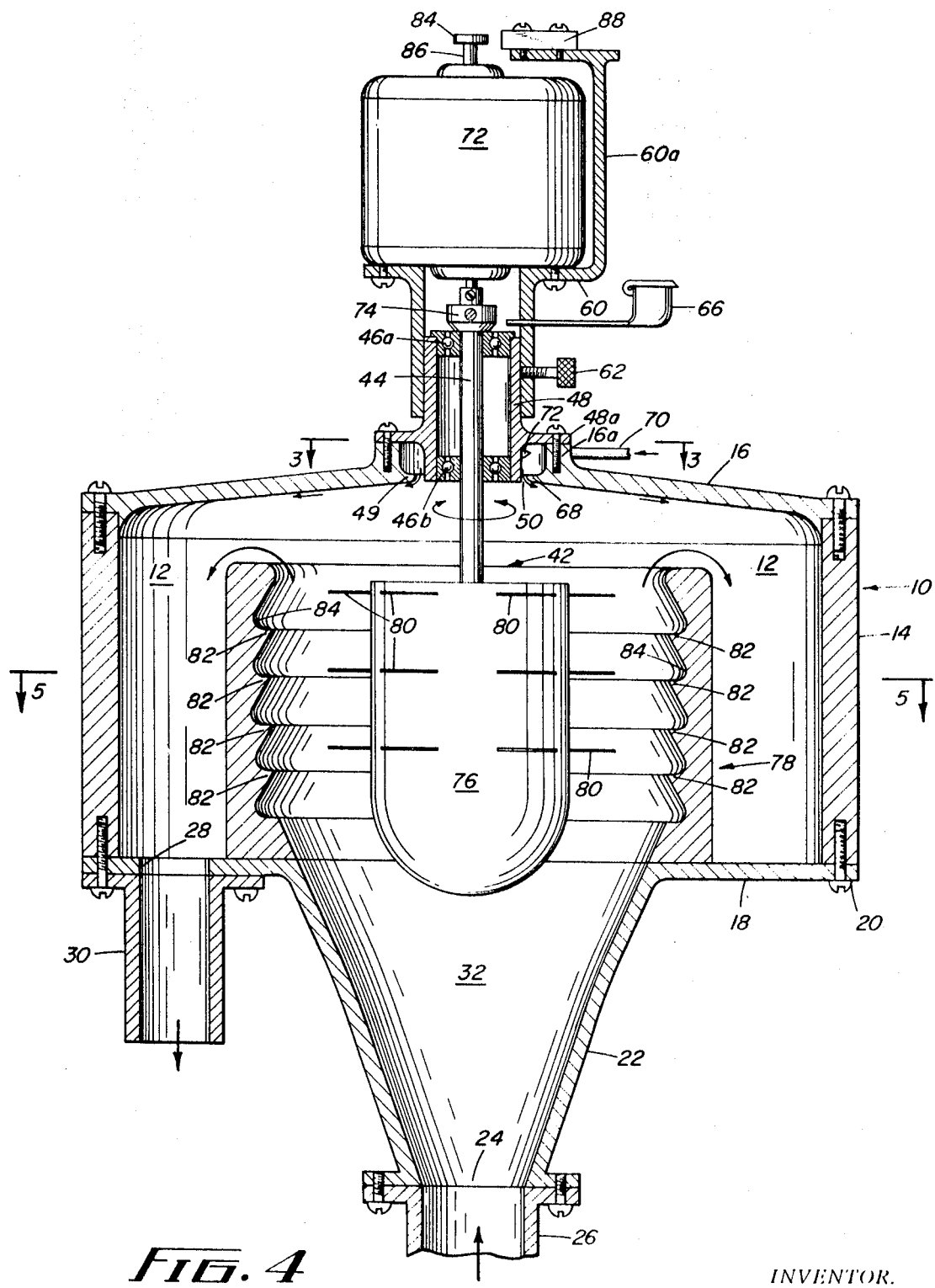
FIG. 4 is a front elevation view in section of the oscillatory rotary motion consistency meter of the invention.

Referring now to FIG. 4, there is shown another embodiment of the consistency meter of the invention. The meter embodiment of FIG. 4 is similar to the continuous motion meter previously discussed in many of its structural features and in its general theory of operation, but differs in that the rotary motion thereof is oscillatory rather than continuous. Accordingly, only the operational and structural features of the meter of FIG. 4 which differ from the previously discussed continuous motion meter will be described in detail, and reference may be had to the description of the continuous motion meter for the balance.

In the oscillatory motion consistency meter of FIG. 4, the motor 72 may be a four phase stepper motor of, for example, the type manufactured by Murihead Instruments Limited, Stratford, Ontario, Canada. Motor 72 is connected to drive shaft 44 by a direct coupling 74. It is preferable not to use a linkage of the type used in the continuous motion consistency meter since any play in such a linkage could introduce considerable error into an oscillating system.

Figure 5:
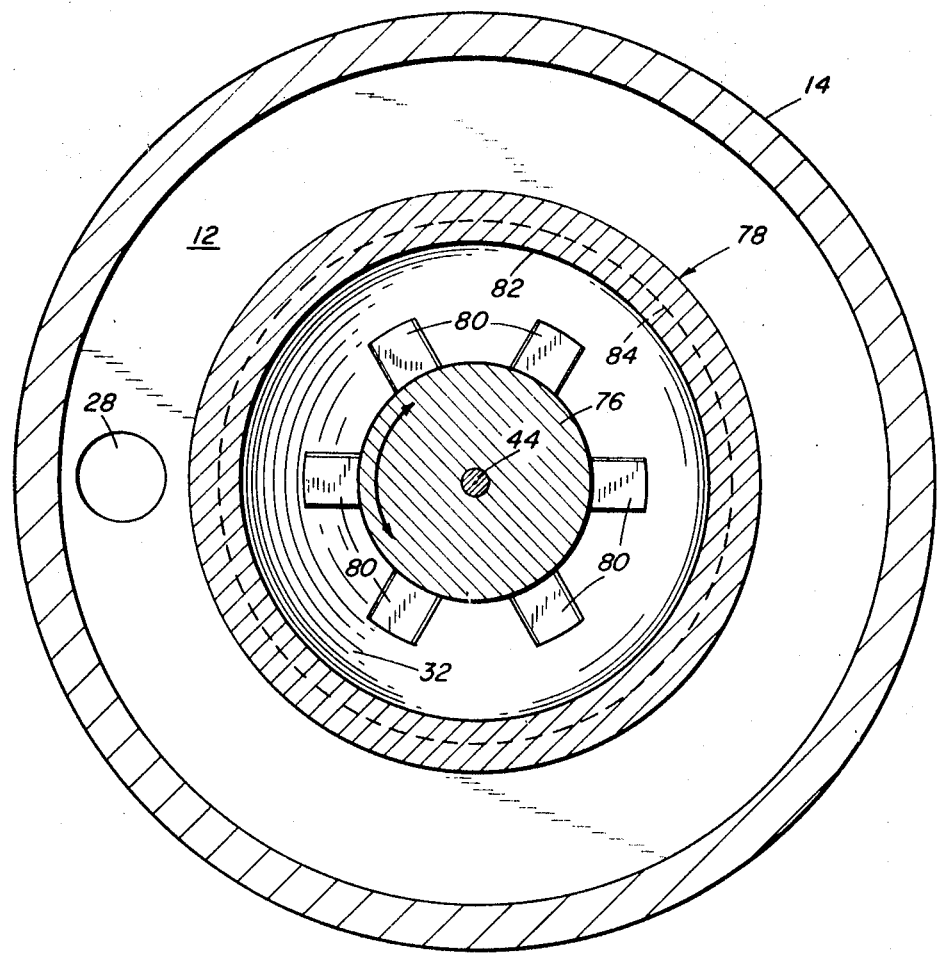
FIG. 5 is a top plan sectional view taken along line 5—5 of FIG. 4.

As in the continuous motion meter, drive shaft 44 terminates in an enlarged rotor 76 which projects down into expansion chamber 32, and is concentric with a surrounding shroud 78. Rotor 76 carries a plurality of thin, planar blades 80 in the form of thin plates projecting perpendicularly from rotor 76 as shown in FIG. 5. Blades 80 may be satisfactorily made from corrosion resistant metal of approximately .004 inch thickness and are preferably provided with sharp, carbide edges. Blades 80 are also preferably provided in a plurality of stacked groups on rotor 76 (FIG. 4) and the number and spacing of the blades in each group may be varied as required. Each blade 80 is mounted to rotor 76 with its plane perpendicular to the axis of rotation of rotor 76 so that only the thin edges of each blade are presented to the stock solution during rotation. Thus, extraneous factors such as the density, viscosity and composition of the liquid portions of the stock solution are also substantially eliminated in the oscillatory motion meter.

The shroud 78 surrounding rotor 76 and its projecting blades 80 has a plurality of protrusions 82 directed inwardly from the inner surface thereof as shown in FIG. 4. As further shown, protrusions 82 are aligned substantially perpendicular to the flow of stock solution through expansion chamber 32. The protrusions thus induce hydraulic braking of the stock solution adjacent the inner wall of shroud 78 in the direction of stock flow. This increases the stock flow through blades 80 for greater accuracy. Although protrusions 82 as shown in FIG. 4 are formed by scalloped cuts 84 into the inner surface of shroud 78, other protrusion configurations may also be used for the same purpose.

In operation, blades 80 are oscillated by means of motor 72 through a predetermined arc in the stock solution flowing through expansion chamber 32. Preferably, motor 72 operates at constant torque output. Under these conditions the fibers in the stock solution tend to alternately snag or staple over opposite edges of blades 80 as rotor 76 is oscillated. This causes a degree of hydraulic drag against motor 72 which results in a decrease in its oscillating frequency. Thus, the oscillating frequency of the motor is inversely related to the amount of fibers in the stock solution and can be measured as an indicator thereof.

Blades 80, like the blades in the previously described continuous motion meter, are in effect self-cleaning. Because of the oscillatory motion of the meter, fibers stapled over one edge of each blade in one cycle are swept off during the reverse cycle so that clogging of rotor 76 is prevented.

The arc through which motor 72 oscillates rotor 76 and its blades 80 is controlled by a permanent magnet 84 mounted to an extension of the motor shaft 86 as shown in FIG. 4. Adjacent magnet 84 there is mounted a magnet-actuated switch 88 supported on an extension arm 60a of motor bracket 60. Switch 88 acts to limit the movement of shaft 86 and may be an SPDT magnet actuated, mercury film switch of the type manufactured, for example, by Fifth Dimension, Inc., Princeton, N.J. The frequency of oscillation of motor 72 may be conveniently measured with a pulse counter (not shown) to indicate the consistency of the stock solution.

Although the oscillatory motion meter has been described for use in conjunction with a constant torque, oscillating motor, it will be understood that alternatively a constant frequency oscillating motor may be used, and the increase in torque or motor load measured as an indicator of stock consistency.

It will thus be seen that the objects et forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A consistency meter for the measurement of fiber content in a stock solution, using the effects of fiber stapling, comprising, in combination:

(A) means comprising an inner chamber, (B) means providing an inlet to said inner chamber for the stock solution, (C) means providing an outlet from said inner chamber for the stock solution, (D) a rotatable shaft structure projecting into said inner chamber, (E) at least one thin, substantially planar blade projecting from said shaft structure within said inner chamber, (1) the plane of each said blade being substantially perpendicular to the axis of rotation of said shaft structure, and (F) each said blade including means forming at least one edge disposed to snag fibers from the stock solution during rotation thereof, and (G) a motor connected with said rotatable shaft structure, said motor having at least one substantially constant output parameter, whereby upon rotation of said shaft structure by said motor, the fibers in the stock solution staple over said edge of each said blade and change an output variable of said motor by a measurable amount related to fiber content.

2. A consistency meter as defined in claim 1 wherein said inner chamber communicates with an expansion chamber of tapered cross section increasing in volume between said inlet means and a portion adjacent said blades, whereby the flow velocity of the stock solution entering said meter is substantially decreased by the time it contacts said blades.

3. A consistency meter as defined in claim 2 wherein said expansion chamber portion adjacent said blades comprises a shroud formed by a substantially circular rim concentric with said shaft structure and surrounding the area traversed by said rotating blades.

4. A consistency meter as defined in claim 3 having continuous rotary motion and wherein the surface of said shroud adjacent said blades is formed with protrusions aligned substantially parallel to the axis of rotation of said shaft structure to produce hydraulic braking of the stock solution in the direction of rotation of said blades.

5. A consistency meter as defined in claim 3 having oscillatory rotary motion and wherein the surface of said shroud adjacent said blades is formed with protrusions aligned to produce hydraulic braking of the stock solution adjacent to said shroud in the direction of stock flow through said expansion chamber.

6. A consistency meter as defined in claim 1 having continuous rotary motion wherein said blades comprise a plurality of eccentrically curved segments mounted to said shaft structure, each said segment approaching a tangential matching with said shaft structure at the leading edge thereof and flaring to an extended trailing edge, whereby fibers may staple over and slide along the edge of each blade to produce hydraulic drag against said motor.

7. A consistency meter as defined in claim 6 having continuous rotary motion wherein said blades are arranged to form a plurality of stacked pairs on said shaft structure, each said pair of blades having the leading edge of each blade substantially abutting the trailing edge of the other blade 8. A consistency meter as defined in claim 1 having oscillatory rotary motion wherein said blades comprise a plurality of thin plates projecting perpendicularly from said shaft structure.

9. A consistency meter as defined in claim 8 having oscillatory rotary motion wherein said blades are arranged in a plurality of stacked groups on said shaft structure.

10. A consistency meter as defined in claim 1 including means for washing down the walls of said inner chamber with a vortex of water without substantial effect on said blades.

11. A consistency meter as defined in claim 1 wherein said constant motor output parameter is constant speed.

12. A consistency meter as defined in claim 1 wherein said constant motor output parameter is constant torque.

13. A consistency meter as defined in claim 12 wherein said motor is an oscillating type.

14. A continuous motion consistency meter for the measurement of fiber content in a stock solution comprising, in combination:
(A) a housing defining an inner chamber,
(B) a rotatable shaft structure projecting into said inner chamber and carrying a plurality of thin, substantially planar blades projecting therefrom with the plane of each said blade being substantially perpendicular to the axis of rotation of said shaft structure,
(1) each said blade being an eccentrically curved segment mounted to said shaft structure, the leading edge thereof approaching a tangential matching with said shaft structure and flaring to an extended trailing edge,
(C) an expansion chamber of tapered cross section communicating with said inner chamber,
(1) said expansion chamber increasing in volume from an inlet for the stock solution at one end thereof, to a shroud at the other end thereof comprising a substantially circular rim having an inner surface concentric with said shaft structure and surrounding the area traversed by said rotating blades, said inner surface being formed with protrusions aligned substantially parallel to the axis of rotation of said shaft structure to produce hydraulic braking of the stock solution in the direction of rotation of said blades,
(D) means providing an outlet from said inner chamber for the stock solution, and
(E) a motor having a substantially constant output and connected with said rotatable shaft structure.

15. An oscillatory motion consistency meter for the measurement of fiber content in a stock solution comprising, in combination:
(A) a housing defining an inner chamber,
(B) a rotatable shaft structure projecting into said inner chamber and carrying a plurality of thin, substantially planar blades projecting therefrom with the plane of each said blade being substantially perpendicular to the axis of rotation of said shaft structure,
(1) each said blade comprising a thin plate projecting perpendicularly from said shaft structure,
(C) an expansion chamber of tapered cross section communicating with said inner chamber,
(1) said expansion chamber increasing in volume from an inlet for the stock solution at one end thereof, to a shroud at the other end thereof comprising a substantially circular rim having an inner surface concentric with said shaft structure and surrounding the area traversed by said rotating blades, said inner surface being formed with protrusions aligned to produce hydraulic braking of the stock solution in the direction of stock flow through said expansion chamber,
(D) means providing an outlet from said inner chamber for the stock solution, and
(E) an oscillating motor having a substantially constant output and connected with said rotatable shaft structure.

References Cited

UNITED STATES PATENTS

| | | | |
|---|---|---|---|
| 2,267,317 | 12/1941 | Veenschoten | 73—59 |
| 2,626,786 | 1/1953 | McGlothlin | 73—59 X |
| 3,148,533 | 9/1964 | Trimbey | 73—59 |
| 3,163,172 | 12/1964 | Buzzard | 73—54 X |
| 3,285,058 | 11/1966 | Ostroot | 73—59 |
| 3,488,995 | 1/1970 | Zimmerman | 73—59 |

FOREIGN PATENTS

| | | | |
|---|---|---|---|
| 33,813 | 10/1964 | Finland | 73—54 |
| 516,407 | 1/1940 | Great Britain | 73—59 |

LOUIS R PRINCE, Primary Examiner

J. W. ROSKOS, Assistant Examiner

U.S. Cl. X.R.

73—61